(12) United States Patent
Lakich

(10) Patent No.: US 8,384,558 B2
(45) Date of Patent: Feb. 26, 2013

(54) EXTENDING CONTACT LIFE IN REMOTE DISCONNECT APPLICATIONS

(75) Inventor: Daniel M. Lakich, Walhalla, SC (US)

(73) Assignee: Itron, Inc., Liberty Lake, WA (US)

( * ) Notice: Subject to any disclaimer, the term of this patent is extended or adjusted under 35 U.S.C. 154(b) by 1456 days.

(21) Appl. No.: 11/975,142

(22) Filed: Oct. 17, 2007

(65) Prior Publication Data

US 2008/0094248 A1 Apr. 24, 2008

Related U.S. Application Data

(60) Provisional application No. 60/852,742, filed on Oct. 19, 2006.

(51) Int. Cl.
*G08C 19/16* (2006.01)
(52) U.S. Cl. ............ 340/870.01; 327/143; 327/162; 327/163; 327/186; 327/198
(58) Field of Classification Search ............ 340/870.01; 327/143, 162, 163, 186, 198
See application file for complete search history.

(56) References Cited

U.S. PATENT DOCUMENTS

| | | |
|---|---|---|
| 4,000,480 A | 12/1976 | Gray et al. |
| 4,799,062 A | 1/1989 | Sanderford, Jr. et al. |
| 4,864,157 A | 9/1989 | Dickey |
| 4,977,577 A | 12/1990 | Arthur et al. |
| 4,998,102 A | 3/1991 | Wyler et al. |
| 5,067,136 A | 11/1991 | Arthur et al. |
| 5,095,493 A | 3/1992 | Arthur et al. |
| 5,119,396 A | 6/1992 | Snderford, Jr. |
| 5,198,796 A | 3/1993 | Hessling, Jr. |
| 5,265,120 A | 11/1993 | Sanderford, Jr. |
| 5,283,516 A * | 2/1994 | Lohoff .......... 323/322 |
| 5,310,075 A | 5/1994 | Wyler |
| 5,311,541 A | 5/1994 | Sanderford, Jr. |
| 5,377,222 A | 12/1994 | Sanderford, Jr. |
| 5,377,232 A | 12/1994 | Davidov et al. |
| 5,457,713 A | 10/1995 | Sanderford, Jr. et al. |
| 5,486,805 A | 1/1996 | Mak |
| 5,598,427 A | 1/1997 | Arthur et al. |
| 5,604,768 A | 2/1997 | Fulton |
| 5,626,755 A | 5/1997 | Keyser et al. |
| 5,640,154 A * | 6/1997 | Meyer et al. ............ 340/870.18 |
| 5,661,750 A | 8/1997 | Fulton |
| 5,668,828 A | 9/1997 | Sanderford, Jr. et al. |
| 5,696,441 A | 12/1997 | Mak et al. |

(Continued)

OTHER PUBLICATIONS

International Search Report for PCT International Application No. PCT/US07/22247 mailed Mar. 3, 2008.

*Primary Examiner* — Albert Wong
*Assistant Examiner* — Amine Benlagsir
(74) *Attorney, Agent, or Firm* — Dority & Manning, P.A.

(57) ABSTRACT

Disclosed are apparatus and methodology subject matters for providing improved functionality of a meter in a 2-way communications arrangement, such as an Advanced Metering System (AMS) or Infrastructure (AMI). More particularly, the present technology relates to methodologies and apparatus for providing load sensing for utility meters which preferably are operable with remote disconnect features in an Advanced Metering Infrastructure (AMI) open operational framework. Meters per the present subject matter utilize a detection circuit, and separately utilize certain remote disconnect functionality. In particular, disconnect functionality is coupled with consideration of electric load information, such as load current as determined by the metering functionality. Providing such functionality allows for the following, all in accordance with the present subject matter: (a) frequent on/off cycling of the electrical service, (b) disconnection of service while full rated current is being delivered through the switch contacts, (c) preservation of switch contact integrity by selective switch operation based on current load, and (d) providing immediate override functionality if needed.

21 Claims, 4 Drawing Sheets

U.S. PATENT DOCUMENTS

| | | |
|---|---|---|
| RE35,829 E | 6/1998 | Sanderford, Jr. |
| 5,804,991 A * | 9/1998 | Hu .................................. 327/162 |
| 5,920,589 A | 7/1999 | Rouquette et al. |
| 5,926,531 A | 7/1999 | Petite |
| 5,929,749 A * | 7/1999 | Slonim et al. ............ 340/870.01 |
| 5,933,072 A | 8/1999 | Kelley |
| 5,933,304 A * | 8/1999 | Irissou ............................... 361/8 |
| 5,953,368 A | 9/1999 | Sanderford et al. |
| 5,987,058 A | 11/1999 | Sanderford et al. |
| 6,018,152 A * | 1/2000 | Allaire et al. .................. 219/501 |
| 6,028,522 A | 2/2000 | Petite |
| 6,031,883 A | 2/2000 | Sanderford, Jr. et al. |
| 6,044,062 A | 3/2000 | Brownrigg et al. |
| 6,047,016 A | 4/2000 | Ramberg et al. |
| 6,100,816 A | 8/2000 | Moore |
| 6,163,276 A | 12/2000 | Irving et al. |
| 6,178,197 B1 | 1/2001 | Froelich et al. |
| 6,181,258 B1 | 1/2001 | Summers et al. |
| 6,195,018 B1 | 2/2001 | Ragle et al. |
| 6,218,953 B1 | 4/2001 | Petite |
| 6,232,885 B1 | 5/2001 | Ridenour et al. |
| 6,233,327 B1 | 5/2001 | Petite |
| 6,246,677 B1 | 6/2001 | Nap et al. |
| 6,249,516 B1 | 6/2001 | Brownrigg et al. |
| 6,263,009 B1 | 7/2001 | Ramberg et al. |
| 6,335,953 B1 | 1/2002 | Sanderford, Jr. et al. |
| 6,363,057 B1 | 3/2002 | Ardalan et al. |
| 6,369,769 B1 | 4/2002 | Nap et al. |
| 6,377,609 B1 | 4/2002 | Brennan, Jr. |
| 6,396,172 B1 * | 5/2002 | Couture ......................... 307/125 |
| 6,396,839 B1 | 5/2002 | Ardalan et al. |
| 6,424,270 B1 | 7/2002 | Ali |
| 6,426,027 B1 | 7/2002 | Scarborough, III et al. |
| 6,430,268 B1 | 8/2002 | Petite |
| 6,437,692 B1 | 8/2002 | Petite et al. |
| 6,452,986 B1 | 9/2002 | Luxford et al. |
| 6,456,644 B1 | 9/2002 | Ramberg et al. |
| 6,538,577 B1 | 3/2003 | Ehrke et al. |
| 6,604,434 B1 | 8/2003 | Hamilton et al. |
| 6,612,188 B2 | 9/2003 | Hamilton |
| 6,617,879 B1 | 9/2003 | Chung |
| 6,617,976 B2 | 9/2003 | Walden et al. |
| 6,617,978 B2 | 9/2003 | Ridenour et al. |
| 6,618,578 B1 | 9/2003 | Petite |
| 6,626,048 B1 | 9/2003 | Dam Es et al. |
| 6,628,764 B1 | 9/2003 | Petite |
| 6,639,939 B1 | 10/2003 | Naden et al. |
| 6,650,249 B2 | 11/2003 | Meyer et al. |
| 6,657,552 B2 | 12/2003 | Belski et al. |
| 6,671,586 B2 | 12/2003 | David et al. |
| 6,700,902 B1 | 3/2004 | Meyer |
| 6,704,301 B2 | 3/2004 | Chari et al. |
| 6,734,663 B2 | 5/2004 | Fye et al. |
| 6,747,557 B1 | 6/2004 | Petite et al. |
| 6,747,981 B2 | 6/2004 | Ardalan et al. |
| 6,754,092 B2 | 6/2004 | McDowell et al. |
| 6,778,099 B1 | 8/2004 | Meyer et al. |
| 6,784,807 B2 | 8/2004 | Petite et al. |
| 6,816,538 B2 | 11/2004 | Shuey et al. |
| 6,832,135 B2 | 12/2004 | Ying |
| 6,836,108 B1 | 12/2004 | Balko et al. |
| 6,836,737 B2 | 12/2004 | Petite et al. |
| 6,850,197 B2 | 2/2005 | Paun |
| 6,859,186 B2 | 2/2005 | Lizalek et al. |
| 6,862,498 B2 | 3/2005 | David et al. |
| 6,867,707 B1 | 3/2005 | Kelley et al. |
| 6,885,309 B1 | 4/2005 | Van Heteren |
| 6,891,838 B1 | 5/2005 | Petite et al. |
| 6,900,737 B1 | 5/2005 | Ardalan et al. |
| 6,914,533 B2 | 7/2005 | Petite |
| 6,914,893 B2 | 7/2005 | Petite |
| 6,918,311 B2 | 7/2005 | Nathan |
| 6,931,445 B2 | 8/2005 | Davis |
| 6,940,396 B2 | 9/2005 | Hammond et al. |
| 6,965,575 B2 | 11/2005 | Srikrishna et al. |
| 6,972,555 B2 | 12/2005 | Balko et al. |
| 6,982,651 B2 | 1/2006 | Fischer |
| 7,046,682 B2 | 5/2006 | Carpenter et al. |
| 7,054,271 B2 | 5/2006 | Brownrigg et al. |
| 7,103,511 B2 | 9/2006 | Petite |
| 7,126,494 B2 | 10/2006 | Ardalan et al. |
| 7,319,576 B2 * | 1/2008 | Thompson ....................... 361/85 |
| 7,425,778 B2 * | 9/2008 | Labuschagne et al. .......... 307/14 |
| 8,049,642 B2 * | 11/2011 | Makinson et al. ........ 340/870.02 |
| 2002/0019725 A1 | 2/2002 | Petite |
| 2002/0146985 A1 | 10/2002 | Naden |
| 2002/0169643 A1 | 11/2002 | Petite et al. |
| 2003/0048199 A1 | 3/2003 | Zigdon et al. |
| 2003/0063723 A1 | 4/2003 | Booth et al. |
| 2003/0078029 A1 | 4/2003 | Petite |
| 2003/0093484 A1 | 5/2003 | Petite |
| 2003/0103486 A1 | 6/2003 | Salt et al. |
| 2003/0179149 A1 | 9/2003 | Savage et al. |
| 2004/0004555 A1 | 1/2004 | Martin |
| 2004/0008663 A1 | 1/2004 | Srikrishna et al. |
| 2004/0040368 A1 | 3/2004 | Guckenberger et al. |
| 2004/0053639 A1 | 3/2004 | Petite et al. |
| 2004/0061623 A1 | 4/2004 | Tootoonian Mashhad et al. |
| 2004/0062224 A1 | 4/2004 | Brownrigg et al. |
| 2004/0085928 A1 | 5/2004 | Chari et al. |
| 2004/0088083 A1 | 5/2004 | Davis et al. |
| 2004/0131125 A1 | 7/2004 | Sanderford, Jr. et al. |
| 2004/0183687 A1 | 9/2004 | Petite et al. |
| 2004/0192415 A1 | 9/2004 | Luglio et al. |
| 2004/0218616 A1 | 11/2004 | Ardalan et al. |
| 2004/0264379 A1 | 12/2004 | Srikrishna et al. |
| 2004/0264435 A1 | 12/2004 | Chari et al. |
| 2005/0024235 A1 | 2/2005 | Shuey et al. |
| 2005/0030199 A1 | 2/2005 | Petite et al. |
| 2005/0036487 A1 | 2/2005 | Srikrishna |
| 2005/0043059 A1 | 2/2005 | Petite et al. |
| 2005/0043860 A1 | 2/2005 | Petite |
| 2005/0052290 A1 | 3/2005 | Naden et al. |
| 2005/0052328 A1 | 3/2005 | De Angelis |
| 2005/0068970 A1 | 3/2005 | Srikrishna et al. |
| 2005/0074015 A1 | 4/2005 | Chari et al. |
| 2005/0129005 A1 | 6/2005 | Srikrishna et al. |
| 2005/0147097 A1 | 7/2005 | Chari et al. |
| 2005/0163144 A1 | 7/2005 | Srikrishna et al. |
| 2005/0169020 A1 | 8/2005 | Knill |
| 2005/0171696 A1 | 8/2005 | Naden et al. |
| 2005/0172024 A1 | 8/2005 | Cheifot et al. |
| 2005/0190055 A1 | 9/2005 | Petite |
| 2005/0195768 A1 | 9/2005 | Petite et al. |
| 2005/0195775 A1 | 9/2005 | Petite et al. |
| 2005/0201397 A1 | 9/2005 | Petite |
| 2005/0218873 A1 | 10/2005 | Shuey et al. |
| 2005/0226179 A1 | 10/2005 | Behroozi |
| 2005/0243867 A1 | 11/2005 | Petite |
| 2005/0251401 A1 | 11/2005 | Shuey |
| 2005/0251403 A1 | 11/2005 | Shuey |
| 2005/0271006 A1 | 12/2005 | Chari et al. |
| 2005/0278440 A1 | 12/2005 | Scoggins |
| 2006/0002350 A1 | 1/2006 | Behroozi |
| 2006/0012935 A1 | 1/2006 | Murphy |
| 2006/0018303 A1 | 1/2006 | Sugiarto et al. |
| 2006/0038548 A1 | 2/2006 | Shuey |
| 2006/0043961 A1 | 3/2006 | Loy |
| 2006/0071810 A1 | 4/2006 | Scoggins et al. |
| 2006/0071812 A1 | 4/2006 | Mason, Jr. et al. |
| 2006/0190140 A1 * | 8/2006 | Soni .............................. 700/295 |
| 2008/0088297 A1 * | 4/2008 | Makinson et al. ............. 324/110 |
| 2009/0230779 A1 * | 9/2009 | Ryan et al. .................... 307/125 |

* cited by examiner

EXTENDING CONTACT LIFE IN REMOTE DISCONNECT APPLICATIONS

PRIORITY CLAIM

This application claims the benefit of previously filed U.S. Provisional Patent Application entitled "METHOD OF EXTENDING CONTACT LIFE IN REMOTE DISCONNECT APPLICATIONS," assigned U.S. Ser. No. 60/852,742, filed Oct. 19, 2006, and which is hereby incorporated herein by reference in its entirety for all purposes.

FIELD OF THE INVENTION

The present technology relates to utility meters. More particularly, the present technology relates to methodologies and apparatus for controlling aspects of remote disconnect features in an Advanced Metering Infrastructure (AMI) open operational framework to extend the operational life of breaker contacts provided within utility meters.

BACKGROUND OF THE INVENTION

The general object of metrology is to monitor one or more selected physical phenomena to permit a record of monitored events. Such basic purpose of metrology can be applied to a variety of metering devices used in a number of contexts. One broad area of measurement relates, for example, to utility meters. Such role may also specifically include, in such context, the monitoring of the consumption or production of a variety of forms of energy or other commodities, for example, including but not limited to, electricity, water, gas, or oil.

More particularly concerning electricity meters, mechanical forms of registers have been historically used for outputting accumulated electricity consumption data. Such an approach provided a relatively dependable field device, especially for the basic or relatively lower level task of simply monitoring accumulated kilowatt-hour consumption.

The foregoing basic mechanical form of register was typically limited in its mode of output, so that only a very basic or lower level metrology function was achieved. Subsequently, electronic forms of metrology devices began to be introduced, to permit relatively higher levels of monitoring, involving different forms and modes of data.

In the context of electricity meters specifically, for a variety of management and billing purposes, it became desirable to obtain usage data beyond the basic kilowatt-hour consumption readings available with many electricity meters. For example, additional desired data included rate of electricity consumption, or date and time of consumption (so-called "time of use" data). Solid state devices provided on printed circuit boards, for example, utilizing programmable integrated circuit components, have provided effective tools for implementing many of such higher level monitoring functions desired in the electricity meter context.

In addition to the beneficial introduction of electronic forms of metrology, a variety of electronic registers have been introduced with certain advantages. Still further, other forms of data output have been introduced and are beneficial for certain applications, including wired transmissions, data output via radio frequency transmission, pulse output of data, and telephone line connection via such as modems or cellular linkups.

The advent of such variety and alternatives has often required utility companies to make choices about which technologies to utilize. Such choices have from time to time been made based on philosophical points and preferences and/or based on practical points such as, training and familiarity of field personnel with specific designs.

Another aspect of the progression of technology in such area of metrology is that various retrofit arrangements have been instituted. For example, some attempts have been made to provide basic metering devices with selected more advanced features without having to completely change or replace the basic meter in the field. For example, attempts have been made to outfit a basically mechanical metering device with electronic output of data, such as for facilitating radio telemetry linkages.

Another aspect of the electricity meter industry is that utility companies have large-scale requirements, sometimes involving literally hundreds of thousands of individual meter installations, or data points. Implementing incremental changes in technology, such as retrofitting new features into existing equipment, or attempting to implement changes to basic components which make various components not interchangeable with other configurations already in the field, can generate considerable industry problems.

Electricity meters typically include input circuitry for receiving voltage and current signals at the electrical service. Input circuitry of whatever type or specific design for receiving the electrical service current signals is referred to herein generally as current acquisition circuitry, while input circuitry of whatever type or design for receiving the electrical service voltage signals is referred to herein generally as voltage acquisition circuitry.

Electricity meter input circuitry may be provided with capabilities of monitoring one or more phases, depending on whether monitoring is to be provided in a single or multiphase environment. Moreover, it is desirable that selectively configurable circuitry may be provided so as to enable the provision of new, alternative or upgraded services or processing capabilities within an existing metering device. Such variations in desired monitoring environments or capabilities, however, lead to the requirement that a number of different metrology configurations be devised to accommodate the number of phases required or desired to be monitored or to provide alternative, additional or upgraded processing capability within a utility meter.

More recently a new ANSI protocol, ANSI C12.22, is being developed that may be used to permit open protocol communications among metrology devices from various manufacturers. C12.22 is the designation of the latest subclass of the ANSI C12.xx family of Meter Communication and Data standards presently under development. Presently defined standards include ANSI C12.18 relating to protocol specifications for Type 2 optical ports; ANSI C12.19 relating to Utility industry Meter Data Table definitions; and ANSI C12.21 relating to Plain Old Telephone Service (POTS) transport of C12.19 Data Tables definition. It should be appreciated that while the remainder of the present discussion may describe C12.22 as a standard protocol, that, at least at the time of filing the present application, such protocol is still being developed so that the present disclosure is actually intended to describe an open protocol that may be used as a communications protocol for networked metrology and is referred to for discussion purposes as the C12.22 standard or C12.22 protocol.

C12.22 is an application layer protocol that provides for the transport of C12.19 data tables over any network medium. Current standards for the C12.22 protocol include: authentication and encryption features; addressing methodology providing unique identifiers for corporate, communication, and end device entities; self describing data models; and message routing over heterogeneous networks.

Much as HTTP protocol provides for a common application layer for web browsers, C12.22 provides for a common application layer for metering devices. Benefits of using such a standard include the provision of: a methodology for both session and session-less communications; common data encryption and security; a common addressing mechanism for use over both proprietary and non-proprietary network mediums; interoperability among metering devices within a common communication environment; system integration with third-party devices through common interfaces and gateway abstraction; both 2-way and 1-way communications with end devices; and enhanced security, reliability and speed for transferring meter data over heterogeneous networks.

To understand why utilities are keenly interested in open protocol communications; consider the process and ease of sending e-mails from a laptop computer or a smart phone. Internet providers depend on the use of open protocols to provide e-mail service. E-mails are sent and received as long as e-mail addresses are valid, mailboxes are not full, and communication paths are functional. Most e-mail users have the option of choosing among several Internet providers and several technologies, from dial-up to cellular to broadband, depending mostly on the cost, speed, and mobility. The e-mail addresses are in a common format, and the protocols call for the e-mail to be carried by communication carriers without changing the e-mail. The open protocol laid out in the ANSI C.12.22 standard provides the same opportunity for meter communications over networks.

One function previously known has been to integrally incorporate a whole service disconnection device with a meter. Such a feature or function, known also as "remote disconnect," allows the entire electrical service to be switched off at a location where the remote disconnect switch (or meter with integral remote disconnect function) is installed.

In general, it may be possible to variously communicate instructions to such remote disconnect switch (whether such comprises an independent device or one integrally provided in conjunction with a meter). For example, there are so-called 2-way communications linkages which could offer such communication ability. The above-referenced Advanced Metering Infrastructure (AMI) environment would also generally provide such communication ability, though it is to be understood that 2-way communications are not the same as an AMI environment, per se.

In general, 2-way communications involve technology that supports bi-directional communications, and may involve an endpoint device such as a meter. Typical attributes in such circumstances are that there is generally high data collection reliability, the ability to obtain register reads generally on demand, and the ability to perform a demand reset, as well as the above-mentioned remote disconnect (and re-connect) functionality. AMI can generally provide such attributes as typically associated with a communications link as well as provide what may be thought of (in a metering context) as integral demand response, such as load control and verification, critical Peak Pricing management, consumer access, 3rd party devices certified on network, and other Advanced Metering functionality (now or later developed). So, generally speaking, AMI typically involves 2-way communications but not all 2-way communications involve or support AMI functionality.

In addition, the desire for increased processing capabilities as well as other considerations including, but not limited to, a desire to provide enhanced capabilities resulting in improved functionality, and greater economy vis-à-vis load control for individual metrology components in an open operational framework, leads to requirements for interfacing such components with system applications.

As such, it is desired to provide an improved interface for disconnecting utility meters from their respective load side environment, in an open operational framework.

While various aspects and alternative embodiments may be known in the field of utility metering, no one design has emerged that generally encompasses the above-referenced characteristics and other desirable features associated with utility metering technology as herein presented.

SUMMARY OF THE INVENTION

In view of the recognized features encountered in the prior art and addressed by the present subject matter, improved apparatus and methodologies of metrology devices in an open operational framework vis-à-vis their load side environment have been provided.

In exemplary arrangements, methodologies and apparatus have been provided to permit transmission of operational data and information between a utility meter and an operational application through a network.

In one of its simpler forms, the present technology provides methodologies and apparatus for interface between operational data and control via a network and meters operatively associated with such network.

One positive aspect of such interface is that it functions to provide enhanced capabilities resulting in improved functionality based on load side environment data at each respective meter operatively associated with such network.

Another positive aspect of such interface is that it functions to provide enhanced and/or increased capabilities resulting in improved functionality based on load side environment data at each respective meter operatively associated with such network.

Yet another positive aspect of such interface is that it functions to provide greater economy vis-à-vis enhanced and/or increased load control capabilities resulting in improved functionality based on load side environment data at each respective meter operatively associated with such network.

Yet still a further positive aspect of such interface is that a methodology has been developed for controlling aspects of a disconnect instruction based on load side environment data at each respective meter operatively associated with such network. In present exemplary embodiments, electric load information (such as load current as determined by the metering functionality) may be taken into consideration as part of disconnect functionality.

In further present exemplary aspects, there is the provision preferably of a detection circuit, situated downstream of a remote disconnect switching functionality, and by which so-called "load side" voltage may be sensed. In such fashion, the present technology advantageously permits verification that the disconnect function was operative after an appropriate instruction, and alternately that a re-connect functionality was operative after an appropriate instruction.

Yet further exemplary aspects of the present technology relate to enhanced and/or increased breaker contact life. More specifically, verification of load levels below a predetermined level before a switch is opened and service is disconnected, could help prevent equipment-damaging contact arcing conditions. In other words, such form of load limiting has the potential to increase the number of disconnect/connect cycles of the disconnect switch/breaker, thus increasing its service life and reducing the costs of manpower intensive field service calls. Again, any performance issue which is a threat to equipment life can ultimately become a higher operational cost for the system operators, so the present subject matter advantageously contributes to greater efficiency of operation to the extent that it can help increase service life under intended operating conditions.

The present subject matter equally relates to methodology as well as related apparatus subject matter. One present exemplary embodiment relates to an electricity meter for use within an advanced metering system having and operating relative to a network. Such a meter may preferably comprise a line side, a load side, metrology, a remote disconnect switch, and a communications link. Such line side preferably receives electrical service when connected to such meter; such load side, downstream from such meter line side, electrically connects with an electrical load when connected to such meter; and such metrology, preferably downstream from such meter line side and upstream from such meter load side, is provided for monitoring the consumption or production of electricity vis-à-vis electrical service and electrical load associated with such meter. Preferably, such remote disconnect switch, situated upstream from such load side and downstream from such meter line side, is controllably actuated for electrically connecting and disconnecting such meter line side relative to such meter load side and any electrical load present at such meter load side, such that disconnection of such meter load side is effective upon satisfaction of disconnect criteria. Such communications link is for linking such meter and a network operating relative to an advanced metering system, such that data may be communicated regarding actuation of such remote disconnect switch.

In some exemplary embodiments of the foregoing exemplary electricity meter, preferably such disconnect criteria may correspond to at least two configurable parameters relative to monitoring of such metrology. In still further exemplary alternatives of the foregoing, preferably one of such at least two configurable parameters comprises a load current threshold below which the load current as determined by such metrology must fall before such remote disconnect switch effects disconnection of such meter load side. Still further, preferably the other of such at least two configurable parameters comprises the maximum time that such remote disconnect switch will wait in order for the load current as determined by such metrology to fall below such load current threshold before effecting disconnection of such meter load side.

In yet other alternative arrangements of the foregoing, such remote disconnect switch may be responsive to an override signal via such communications link to immediately disconnect such meter load side without satisfying such disconnect criteria. In still further alternatives, such remote disconnect switch may be responsive to a zero value in either of such disconnect criteria to immediately disconnect such meter load side without otherwise satisfying such disconnect criteria.

In yet further alternatives of the foregoing, such metrology may include current acquisition circuitry for receiving electrical service current signals, and voltage acquisition circuitry for receiving electrical service voltage signals; and such communications link may include at least one bi-directional communications module configured to effect bi-directional communications between such meter and other networked devices using an open standard meter communication protocol, and such at least one communications module includes one of an additional circuit board dedicated to WAN connectivity and one or more of GPRS, Ethernet, and RF LAN communications modules. In some embodiments, such current acquisition circuitry and such voltage acquisition circuitry may be configured for receiving multi-phase electrical service current and voltage signals, respectively.

Another present exemplary embodiment more particularly relates to an advanced metering system with added remote disconnect switch cycle life based on meter disconnect features. Such exemplary embodiment preferably may comprise a plurality of end devices and a network. Preferably at least some of such end devices comprise electricity meters, with each of such electricity meters having a line side for receiving electrical service; a load side, downstream from the meter line side, for electrically connecting with an electrical load; a remote disconnect switch, upstream from the meter load side and downstream from the meter line side, for controllably actuating for electrically connecting and disconnecting the meter line side relative to the meter load side, so that electrical service when present at the meter line side is, respectively, electrically connected with, and disconnected from, an electrical load when present at the meter load side; and metrology, downstream from the meter line side and upstream from the meter load side, for monitoring the consumption or production of electricity vis-à-vis electrical service and electrical load associated with the meter. Such network may preferably include central collection functionality, and may preferably be configured for bi-directional communications between the central collection functionality and each of such plurality of end devices, such that data may be communicated across such network regarding actuation of the remote disconnect switch of an electricity meter and consumption of electricity at the meter load side thereof, with such remote disconnect switch responsive to data indicating that a disconnect operation of the remote disconnect switch is to be conducted, for effecting such disconnect operation once disconnect criteria are satisfied, whereby the disconnect/connect cycle life of the remote disconnect switch is relatively extended.

One exemplary present methodology more particularly relates to methodology for improved functionality of an electricity meter used within an advanced metering system having and operating relative to a network. Such exemplary methodology may comprise providing an electricity meter having a line side for receiving electrical service; a load side, downstream from the meter line side, for electrically connecting with an electrical load; a remote disconnect switch, upstream from the meter load side and downstream from the meter line side, for controllable actuation for electrically connecting and disconnecting the meter line side relative to the meter load side, so that electrical service when present at the meter line side is, respectively, electrically connected with, and disconnected from, an electrical load when present at the meter load side; metrology, downstream from the meter line side and upstream from the meter load side, for monitoring the consumption or production of electricity vis-à-vis electrical service and electrical load associated with the meter; and a communications link, linking the meter and a network operating relative to an advanced metering system. Such methodology may further comprise connecting electrical service to the meter line side; connecting an electrical load to the meter load side; communicating data across the network to the electricity meter regarding actuation of the remote disconnect switch; and responsive to data indicating that a disconnect operation of the remote disconnect switch is to be conducted, effecting such disconnect operation once disconnect criteria are satisfied, whereby the disconnect/connect cycle life of the remote disconnect switch is relatively extended.

Another present exemplary methodology relates to methodology for an advanced metering system with added functionality based on improved connect/disconnect cycle life. Such exemplary methodology may preferably comprise providing a plurality of end devices, at least some of which end devices comprise electricity meters, each of such electricity meters having a line side for receiving electrical service; a load side, downstream from the meter line side, for electrically connecting with an electrical load; a remote disconnect switch, upstream from the meter load side and downstream from the meter line side, for controllable actuation for electrically connecting and disconnecting the meter line side relative to the meter load side, so that electrical service when present at the meter line side is, respectively, electrically connected with, and disconnected from, an electrical load when present at the meter load side; and metrology, downstream from the meter line side and upstream from the meter load side, for monitoring the consumption or production of electricity vis-à-vis electrical service and electrical load associated with the meter; providing a network including central collection functionality; configuring the network for bi-directional communications between the central collection functionality and each of the plurality of end devices; connecting electrical service to the meter line side of at least one of such electricity meters; and connecting an electrical load to the meter load side of such at least one electricity meter; communicating data across the network to such at least one electricity meter regarding actuation of the remote disconnect switch, and regarding consumption of electrical service at such at least one electricity meter; responsive to data indicating that a disconnect operation of the remote disconnect switch at such at least one electricity meter is to be conducted, effecting such disconnect operation once disconnect criteria are satisfied; and responsive to data indicating that a connect operation of the remote disconnect switch at such at least one electricity meter is to be conducted, effecting such connect operation. With the foregoing exemplary embodiment, advantageously the disconnect/connect cycle life of the remote disconnect switch is relatively extended.

Additional present features may alternatively and/or further be practiced with the foregoing exemplary embodiments, whereby additional present embodiments are provided.

Additional objects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents including combinations of features, parts, or steps or configurations thereof not expressly shown in the figures or stated in the detailed description of such figures. Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
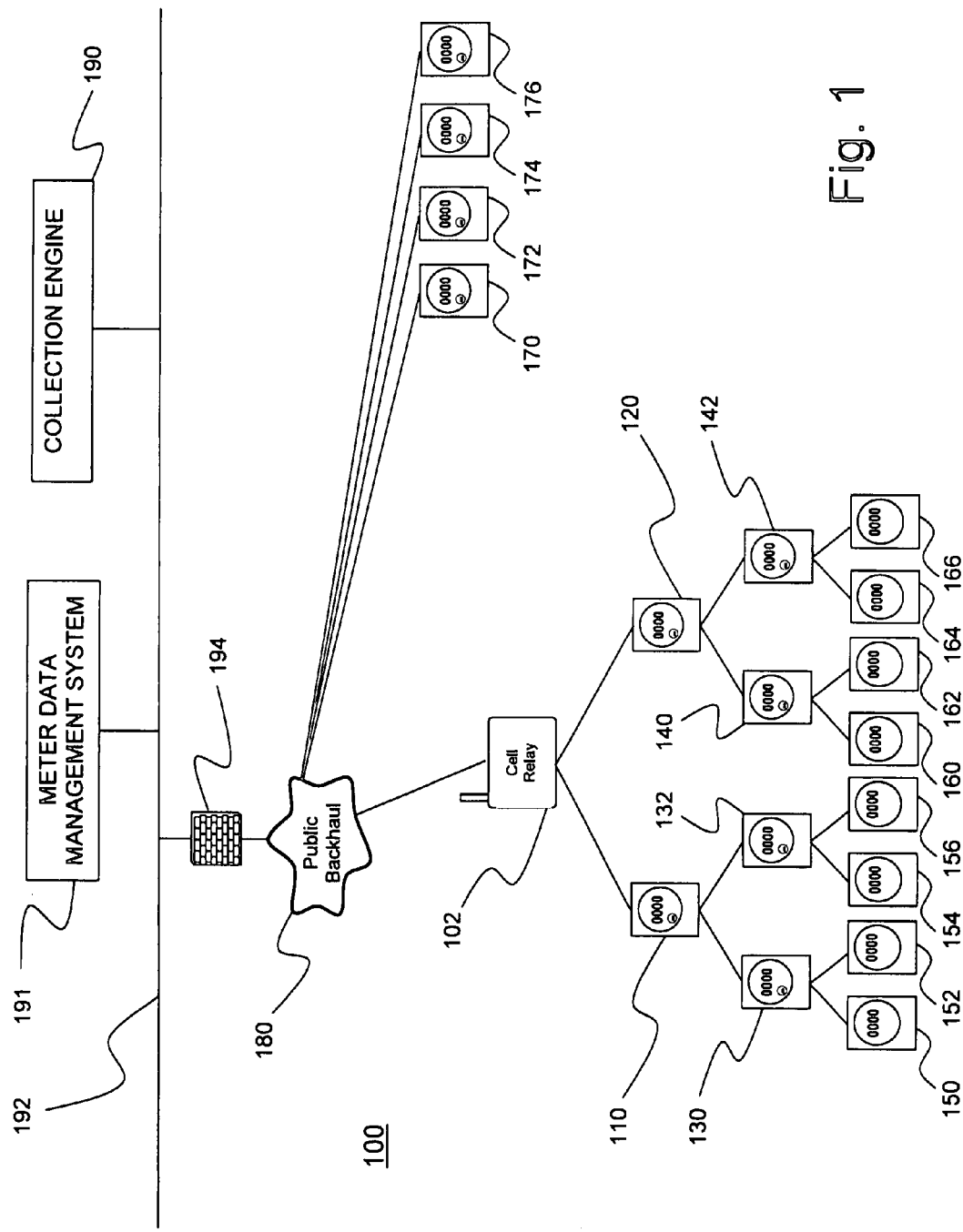
FIG. 1 is a block diagram overview illustration of an exemplary Advanced Metering System (AMS) or Infrastructure (AMI) deployment incorporating various of both apparatus and methodology aspects of the present subject matter.

Repeat use of reference characters throughout the present specification and appended drawings is intended to represent same or analogous features, elements, or steps of the present subject matter.

DETAILED DESCRIPTION OF THE PREFERRED EMBODIMENTS

As discussed in the Summary of the Invention section, the present subject matter is particularly concerned with the provision of improved corresponding apparatus and methodologies allowing enhanced functionality of metrology devices in an open operational framework. More particularly, the present technology relates to methodologies and apparatus for providing load sensing for utility meters which are selectively operable with remote disconnect features in an Advanced Metering Infrastructure (AMI) open operational framework.

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference will now be made in detail to presently preferred embodiments of the subject methodologies and apparatus. Referring to the drawings, FIG. 1 is a block diagram overview illustration of an exemplary Advanced Metering System (AMS) or Infrastructure (AMI) deployment 100 generally in accordance with the present subject matter incorporating various of both apparatus and methodology aspects of the present subject matter.

Advanced Metering System (AMS) 100 in pertinent part is preferably designed and built around industry standard protocols and transports, and therefore is intended to work with standards compliant components from third parties. In other words, AMS 100 is configured to be transparent in a transportation context, such that the exemplary respective meters may be interrogated (such as using representative Collection Engine generally 190) regardless of what network infrastructure exists in between or among such components. Moreover, due to such transparency, the respective meters preferably may also respond to Collection Engine 190 in the same manner. Preferably, as intended to be represented by the illustration in FIG. 1, Collection Engine 190 is capable of integrating Radio, PLC (Power Line Communications), and IP (Internet Protocol) connected meters, details of which communications form no particular aspects of the present subject matter.

In general, it is preferred that the system represented in present FIG. 1 provides full two-way messaging to every device. For example, the respectively represented meter devices may be variously configured to provide differing communications capabilities. In exemplary configurations, one or more of GPRS, Ethernet, and RF LAN communications modules may be provided. GPRS will allow meters to be IP addressable over a public backhaul and provide more bandwidth than the meter will likely ever require, but may incur ongoing subscription costs. Ethernet connectivity can be used to bridge to third party technologies, including WiFi, WiMax, in-home gateways, and BPL (Broadband over Power Lines), without integrating any of these technologies directly into the metering device, but with the tradeoff of requiring external wiring and a two part solution. Ethernet devices may be used primarily in pilots and other special applications, and they additionally may be ideal for certain high-density RF-intolerant environments, such as meter closets. Due to the increased complexity of managing certain interfaces, for example, such as a WAN interface, with its more sophisticated link negotiation requirements and TCP/IP (Transmission Control Protocol/Internet Protocol) stack, WAN connected meters may include an additional circuit board dedicated to WAN connectivity. All such alternative and exemplary supporting boards, if required, are considered to be part of preferred embodiments that sense and communicate control and information data in accordance with the present subject matter, whether using ANSI standard C12.22 communications protocol or otherwise.

Also, as discussed in greater detail herein, it is to be understood that the representative exemplary meter devices of present FIG. 1 are intended to represent meter devices associated respectively with remote disconnect (and re-connect) functionality, as well as other present features relative to load sensing and related features.

Communication with the Collection Engine 190 is preferably performed over an Internet Protocol connection, represented by such connection 192. The Wide-Area-Network is a fully routable, addressable, IP network that may involve a variety of different technologies including, but not limited to, GPRS, WiFi, WiMax, Fiber, Private Ethernet, BPL, or any other connection with sufficiently high bandwidth and ability to support full two-way IP communication. Several assumptions (that is, criteria of the present subject matter) may be made regarding the IP WAN. Collection Engine 190 is preferably implemented so as to be able to communicate directly with other respective nodes on the IP WAN. While communications may be conducted through a firewall 194, it is not necessary that such be proxied, unless the proxy is itself a C12.22 node functioning as a relay between a private IP network and the public IP WAN.

The Advanced Metering System as used in conjunction with the present technology provides a series (or plurality) of services (functionalities) to utilities. Beyond its most basic implementation (daily feeds of residential interval or TOU (Time of Use) data), it may provide power outage and restoration notifications, on-demand readings, firmware updates, load control/demand response, gas meter readings, and in-home display messages. All of such functions (services) may be preferably communicated via the ANSI standard C12.22 protocol.

With further reference to present reference to FIG. 1, it will be seen that an exemplary Advanced Metering System (AMS) generally 100 deployment has been illustrated for exemplary purposes only with a single RF LAN cell, with twelve respective exemplary member nodes organized into three levels, as well as four directly connected IP meters 170, 172, 174, and 176. In such exemplary arrangement of a system in conjunction with which the present subject matter may be practiced, all respective meter devices 110, 120, 130, 132, 140, 142, 150, 152, 154, 156, 160, 162, 164, 166, 170, 172, 174, and 176, Cell Relay 102, and Collection Engine 190, preferably have C12.22 network addresses, with Collection Engine 190 preferably having multiple C12.22 addresses to allow for separate addressing between different services (functionalities). Representative Meter Data Management System 191 is not part of any such C12.22 network, but preferably it will be implemented so as to communicate over the Utility LAN 192 to Collection Engine 190 via Web Services. Communications between Cell Relay 102 and Utility LAN 192 variously involve Public Backhaul 180 and firewall 194, in a manner as referenced above, as well understood by those of ordinary skill in the art.

The meter data acquisition process may be processed through operation of the Meter Data Management System 191, initiating a request for such data. Such requests may be sent out either directly to the device (in the case of an IP connected meter, such as 170), or to Cell Relay 102 that relays the message out to all appropriate nodes. While various tables per a manufacturer's stored procedure may be used, in response to C12.19 stored procedure calls, the various AMS enabled meters of FIG. 1 are preferably field programmable, via C12.19 tables, as to the type data to be included in any default upload. In any event, response processing can use the configured data about an end device and the response message from an end device to determine the results from such device. In the instance of the present subject matter, such operations allow responses that contain logs from the devices, such as relating to above-referenced load side sensed data at a particular installation, all in accordance with the present subject matter.

Figure 2:
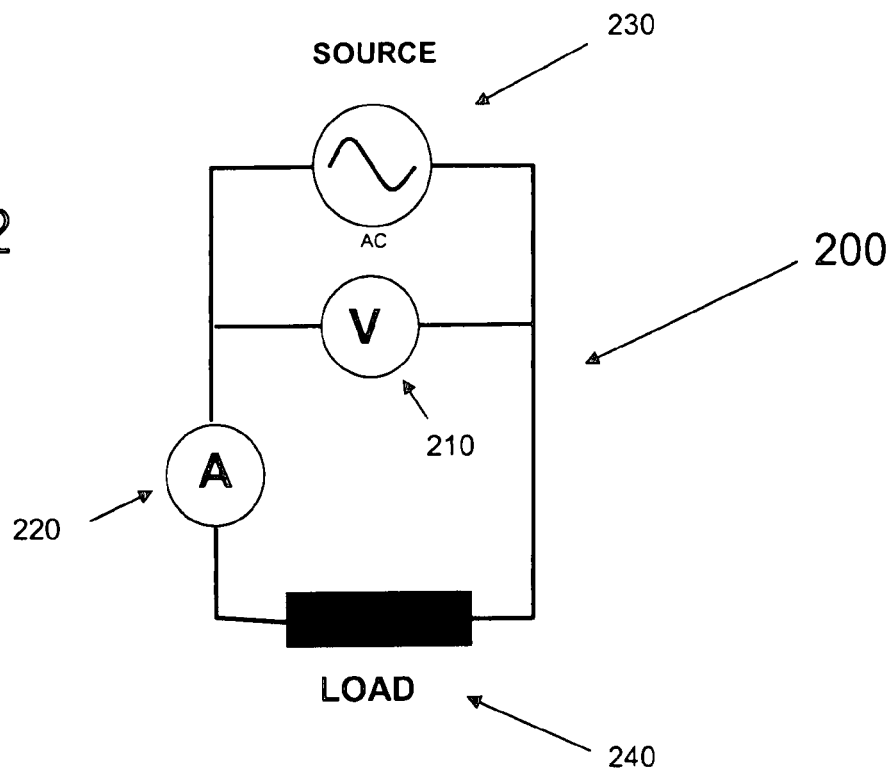
FIG. 2 illustrates for further background discussion purposes a block diagram of an exemplary watthour meter incorporating features in accordance with present ANSI watthour meter configuration standards.
Figure 3:
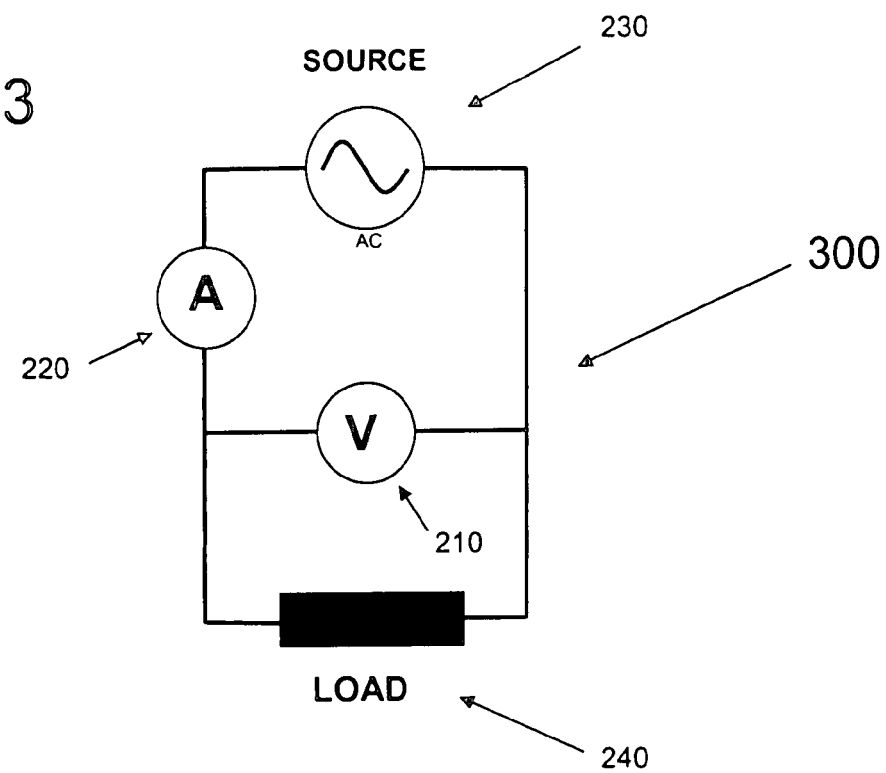
FIG. 3 illustrates for further background discussion purposes a block diagram of an exemplary watthour meter incorporating features in accordance with an alternative arrangement of an exemplary watthour meter configuration.

FIG. 2 illustrates for further background discussion purposes a block diagram of a representative exemplary watthour meter generally 200 incorporating features in accordance with present ANSI watthour meter configuration standards. FIG. 3 on the other hand illustrates for further background discussion purposes a block diagram of a representative exemplary watthour meter generally 300 incorporating features in accordance with an alternative arrangement of an exemplary watthour meter configuration.

The following includes a brief discussion relative to power consumption of a load side voltage detect circuit of an RDS (Remote Disconnect Switch) enabled meter per present subject matter, and the effects thereof on accuracy. As referenced in the above "Background" section as a general proposition, with all watt meters, there is essentially a voltage circuit and a current circuit. If each is separately calibrated, in general the watts determined with such arrangement will never be accurate if watts=V*A cos θ. The reasoning behind such statement is because in the case of a watthour meter design that has the voltmeter portion thereof above (in a supply versus load context) the current meter portion thereof, some current is lost in the voltage circuit and thus such current is not measured by the ammeter. Conversely, in the case of a watthour meter design where the ammeter portion is above the voltmeter portion (again, in the supply versus load context), there will be some voltage drop in the ammeter which is not measured by the voltmeter. Therefore, from a design perspective, some "burden" from the voltmeter or the ammeter must be intentionally removed from the resulting watt reading.

As well known to those of ordinary skill in the art, all ANSI standard watthour meters are arranged in the manner of the watthour meter design generally 200 as diagrammatically represented in present FIG. 2. Such is the watthour meter design that has the voltmeter portion generally 210 thereof above the current meter portion generally 220 thereof (in a supply generally 230 versus load generally 240 context). Because the burden of the ammeter portion generally 220 is never removed, some current is lost in the voltage circuit generally 210 and thus such current is not measured by the ammeter generally 220. From an industry standard perspective, it is generally recognized and understood that (if unaccounted for) any current coil losses would be paid for by the end user. Such fact is equally true in the instance of practicing the present subject matter with reference to any additional resistance losses in the contacts and metal conductors, such as copper, associated with a remote disconnect switch functionality.

Conversely, in the watthour meter design generally 300 diagrammatically represented in present FIG. 3, the burden in the voltmeter portion generally 210 is not measured, and hence any resulting watt losses would be incurred by the utility supplying service to such meter 300.

Figure 4:
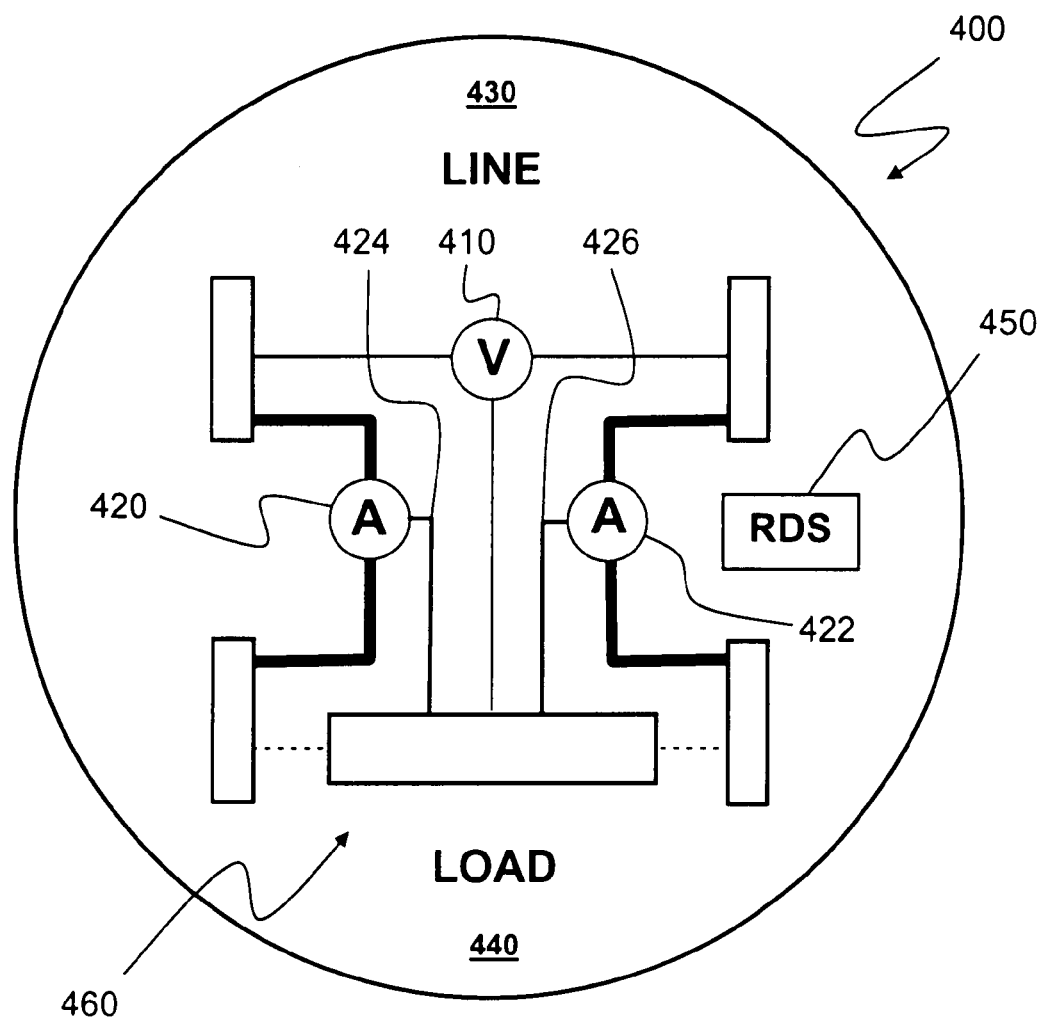
FIG. 4 illustrates for further disclosure purposes relating to present subject matter a block diagram of an exemplary watthour meter incorporating features in accordance with present ANSI watthour meter configuration standards, incorporating remote disconnect features, and further incorporating subject matter of the presently disclosed technology relative to load sensing and related present features.

FIG. 4 illustrates for further disclosure purposes relating to present subject matter a block diagram of an exemplary watthour meter generally 400 incorporating features in accordance with present ANSI watthour meter configuration standards, incorporating remote disconnect features generally 450, and further incorporating subject matter of the presently disclosed technology relative to load sensing and related present features. It is also to be understood by those of ordinary skill in the art that the description herewith of an exemplary meter 400 in accordance with present subject matter is likewise a description of the representative meters variously illustrated in present FIG. 1. It is also to be understood that in some implementations of the present subject matter, not all of the meters utilized in a particular arrangement must conform with all or a particular subset of the features presently described, as some meters in an arrangement may practice the present subject matter while some do not.

The following more particularly describes present subject matter, using for example, load data in conjunction with a meter having remote disconnect service features. In the context of present FIG. 4, it is to be understood that the terminology "downstream" means towards the load side generally 440 thereof versus the source or line side generally 430 thereof, which would be "upstream" of the load side 440. Because integration of a whole service disconnect device or feature per se is not unique to the present subject matter, an RDS (Remote Disconnect Switch) device is only generally represented by block diagram 450. As such, the present subject matter is intended to be usable in combination with all such types of devices and functionality and equivalents thereof, whether now or later existing.

In more particular, the present subject matter utilizes a detection circuit or means generally 460, which may be situated generally downstream of the RDS 450. Such detection circuit or means 460 has a primary purpose and/or function of being able to sense an active load downstream of RDS 450. Providing such functionality allows for the following, all in accordance with the present subject matter: (a) frequent on/off cycling of the electrical service, (b) disconnection of service while full rated current is being delivered through the switch contacts, (c) preservation of switch contact integrity by selective switch operation based on current load, and (d) providing immediate override functionality if needed.

In general, an important aspect of the present subject matter resides in the capability to operate an electricity meter disconnect feature in such a way as to extend the life of relay contacts forming a portion of such disconnect device. In accordance with more specific aspects of the present subject matter, the present subject matter combines a set of programmable thresholds and timing in an electricity meter used to control switching of a relay so as to extend the life of the relay contacts. In an exemplary configuration, the disconnect device (i.e., the relay) may have contacts rated at, for example, 200 amps.

According to an exemplary basic relay controlling algorithm, a set of configurable parameters establishing when to disconnect a load is provided. A command to disconnect a load and commands to override the algorithm when an "immediate" disconnect is necessary may also be provided. The configuration parameters may be stored in an ANSI C12.19 manufacturer's specified table and may correspond to at least two parameters used to control the algorithm.

A first parameter stored in the ANSI C12.19 manufacturer's specified table may correspond to load current threshold. Such parameter, in an exemplary configuration, may correspond to a 2 byte value defining the current at which the load preferably must fall below in order to disconnect the electrical service. A value of zero may be used to disable monitor and may be established as a default value. A second parameter stored in the ANSI C12.19 manufacturer's specified table may correspond to a value designating the maximum number of seconds preferably to wait for the load to drop below the load current threshold value.

According to an exemplary algorithm, once per second a routine runs that monitors the current state and a pending state of disconnect switch RDS. Unless over-ridden, anytime such disconnect switch is in the closed state and is commanded to open, the algorithm is used. A command to open the disconnect switch RDS may come from many different sources including, but not limited to, remote, local, load limiting, and other sources. Any command to open disconnect switch RDS results in a "pending open" condition (state). Pending open indicates the command to open disconnect switch RDS has been invoked and the actual disconnection of electric service is pending. In the pending open state, the current load being measured by meter 400 by way of ammeters 420, 422 via respective lines 424, 426 is converted to load current. The resulting load current is compared to the configured load current threshold. In accordance with the present subject matter, if the actual current falls below the configured load current threshold, and the disconnect switch RDS is in the pending open state, the switch will be opened.

Further in accordance with the present subject matter, at least three ways are provided to override the algorithm. A first override may be affected by executing a remote procedure with an "immediate" parameter selected to "on" to indicate immediate shut-off. Alternatively, the load current threshold can be configured to a value of zero. Similarly, as a third way to in effect override the algorithm, the second parameter stored in the ANSI C12.19 manufacturer's specified table (corresponding to a value designating the maximum number of seconds preferably to wait for the load to drop below the load current threshold value) may also be configured to a value of zero.

Figure 5:
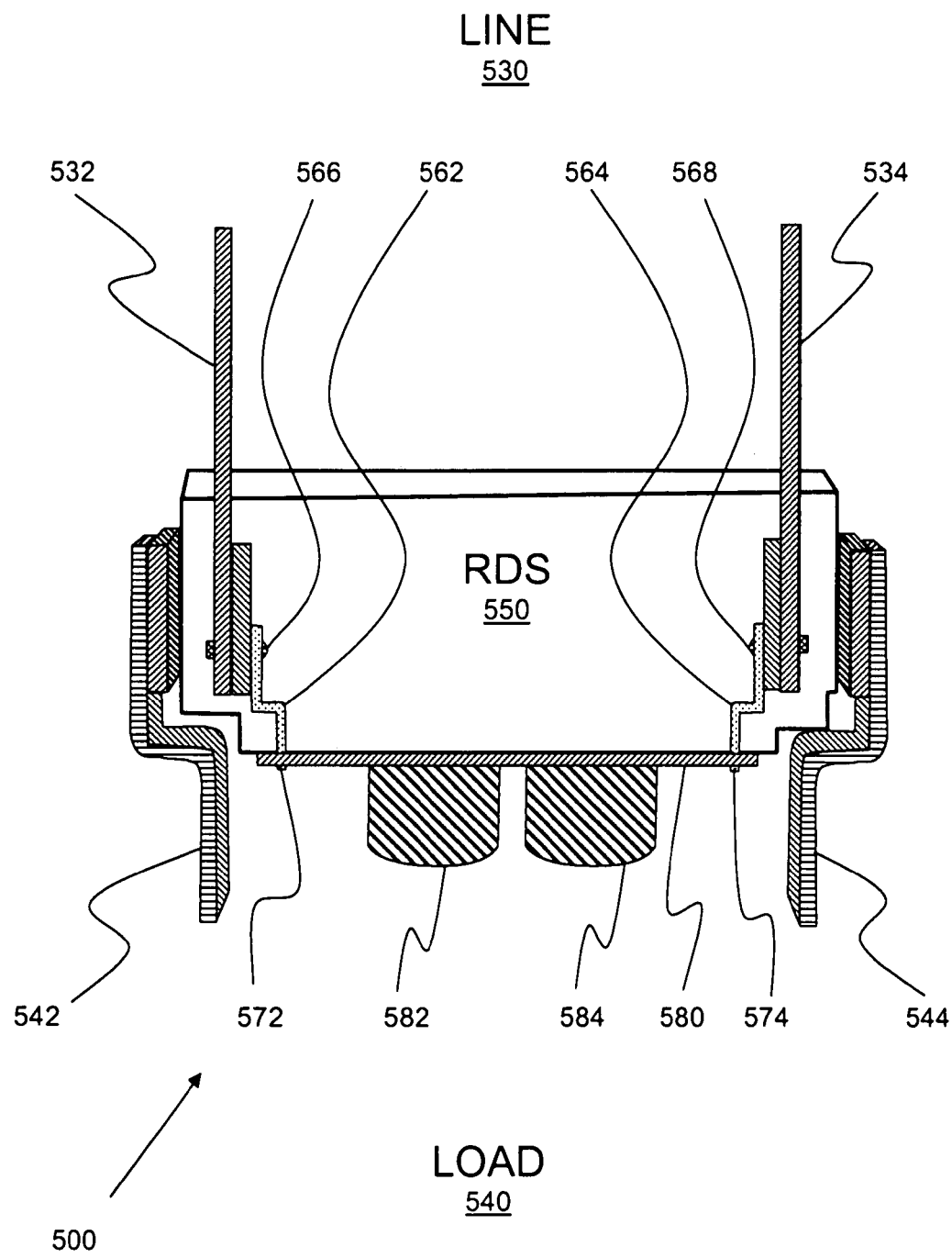
FIG. 5 illustrates for further disclosure purposes relating to present subject matter a side view of an exemplary line side terminal configuration providing line side voltage sensing in accordance with certain confirmation functionality aspects of the present subject matter.

With reference now to FIG. 5, there is illustrated a side view of an exemplary line side terminal configuration providing line side voltage sensing for a watthour meter in accordance with the present subject matter As illustrated, line side terminals 532, 534 of a meter generally 500 constructed in accordance with the present subject matter are provided. Line side terminals 532, 534 are configured to be inserted through the rear portion of a meter case (not illustrated) and may be plugged into a corresponding meter socket for coupling to a voltage supply line, as well understood by those of ordinary skill in the art without additional discussion.

Line side terminals 532, 534 may be mechanically and electrically coupled to input terminals extending from Remote Disconnect Switch (RDS) 550 which, in turn, includes load side terminals 542, 544 extending from RDS 550 and may be coupled through additional conductive elements (not illustrated) to load side components (not illustrated). In an exemplary configuration, RDS 550 may correspond to the electrical switch device disclosed in U.S. Pat. No. 6,046,661 to Reger et al., the disclosure of which is incorporated herein for all purposes.

With further reference to FIG. 5, it will be noticed that there are provided a pair of terminals 562, 564 that are electrically and mechanically coupled to line side terminals 532, 534. Terminals 562, 564, in one exemplary configuration, may be secured at one end to line side terminals 532, 534 by way of rivets 566, 568, respectively. At respective second ends 572, 574 of terminals 562, 564, such ends may be sized to pass through vias in printed wiring board (PWB) 580 for electrical connection to circuit components exemplarily illustrated at 582, 584. In such manner and in accordance with the present subject matter, line side voltage may easily be sampled as previously described.

It should be appreciated that, although the presently illustrated exemplary embodiment shows the use of rivets to couple terminals 562, 564 to line side terminals 532, 534, those of ordinary skill in the art will understand that other coupling methodologies may be provided. For example terminals 562, 564 may be brazed or welded to line side terminals 532, 534. Alternatively, terminals 562, 564 may correspond to coined, integrated protrusions on the line side terminals themselves.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An electricity meter for use within an advanced metering system having and operating relative to a network, comprising:
   a line side which receives electrical service when connected to said meter;
   a load side, downstream from said meter line side, which electrically connects with an electrical load when connected to said meter;
   metrology devices, downstream from said meter line side and upstream from said meter load side, for monitoring the consumption or production of electricity vis-a-vis electrical service and electrical load associated with said meter;
   a remote disconnect switch, upstream from said load side and downstream from said meter line side, controllably actuated for electrically connecting and disconnecting said meter line side relative to said meter load side and any electrical load present at said meter load side, such that disconnection of said meter load side is effective upon satisfaction of disconnect criteria; and
   a communications link, linking said meter and a network operating relative to an advanced metering system, such that data may be communicated regarding actuation of said remote disconnect switch;
   wherein said disconnect criteria include receipt of a disconnect command at said remote disconnect switch and data that said metrology has determined that the consumption of electricity by an electrical load associated with said meter is such that actual current flow has fallen below a predetermined load current threshold.

2. An electricity meter as in claim 1, wherein said disconnect criteria further include the maximum time that said remote disconnect switch will wait in order for the load current as determined by said metrology to fall below said load current threshold before effecting disconnection of said meter load side.

3. An electricity meter as in claim 1, wherein said remote disconnect switch is responsive to an override signal via said communications link to immediately disconnect said meter load side without satisfying said disconnect criteria.

4. An electricity meter as in claim 1, wherein:
   said metrology includes current acquisition circuitry for receiving electrical service current signals, and voltage acquisition circuitry for receiving electrical service voltage signals; and
   said communications link includes at least one bi-directional communications module configured to effect bi-directional communications between said meter and other networked devices using an open standard meter communication protocol, and said at least one communications module includes one of an additional circuit board dedicated to WAN connectivity and one or more of GPRS, Ethernet, and RF LAN communications modules.

5. An electricity meter as in claim 4, wherein said current acquisition circuitry and said voltage acquisition circuitry are configured for receiving multi-phase electrical service current and voltage signals, respectively.

6. An electricity meter as in claim 1, further comprising:
   a pair of line side terminals for receiving electrical service, and connected with said remote disconnect switch; and
   an additional pair of terminals respectively connected with said pair of line side terminals, and connected with said metrology, such that said metrology monitors electrical service at said line side terminals.

7. A methodology for improved functionality of an electricity meter used within an advanced metering system having and operating relative to a network, comprising:
   providing an electricity meter having:
   a line side for receiving electrical service;
   a load side, downstream from the meter line side, for electrically connecting with an electrical load;

a remote disconnect switch, upstream from the meter load side and downstream from the meter line side, for controllable actuation for electrically connecting and disconnecting the meter line side relative to the meter load side, so that electrical service when present at the meter line side is, respectively, electrically connected with, and disconnected from, an electrical load when present at the meter load side;

metrology, downstream from the meter line side and upstream from the meter load side, for monitoring the consumption or production of electricity vis-a-vis electrical service and electrical load associated with the meter; and a communications link, linking the meter and a network operating relative to an advanced metering system;

connecting electrical service to the meter line side; connecting an electrical load to the meter load side;

communicating data across the network to the electricity meter regarding actuation of the remote disconnect switch; and responsive to data indicating that a disconnect operation of the remote disconnect switch is to be conducted, effecting such disconnect operation once disconnect criteria are satisfied, such disconnect criteria including a disconnect command at said remote disconnect switch and data that the metrology has determined that the consumption of electricity by an electrical load associated with such meter is such that actual current flow has fallen below a predetermined load current threshold, whereby the disconnect/connect cycle life of the remote disconnect switch is relatively extended.

8. Methodology as in claim 7, wherein:

the disconnect criteria correspond to at least two configurable parameters relative to monitoring of the metrology;

one of such at least two configurable parameters comprises the maximum time that the disconnect operation of the remote disconnect switch will be delayed to wait for the load current as determined by the metrology to fall below the load current threshold before effecting disconnection of the meter load side.

9. Methodology as in claim 7, further comprising, in response to data indicating that an immediate disconnect operation of the remote disconnect switch is to be conducted, ignoring the disconnect criteria and immediately effecting such disconnect operation.

10. Methodology as in claim 7, further comprising:

providing the metrology with current acquisition circuitry for receiving electrical service current signals, and voltage acquisition circuitry for receiving electrical service voltage signals; and providing the communications link so as to include at least one bi-directional communications module configured to effect bi-directional communications between the meter and other networked devices using an open standard meter communication protocol, with the at least one communications module including one of an additional circuit board dedicated to WAN connectivity and one or more of GPRS, Ethernet, and RF LAN communications modules.

11. Methodology as in claim 10, wherein:

the current acquisition circuitry and the voltage acquisition circuitry are configured for receiving multi-phase electrical service current and voltage signals, respectively;

the meter further includes a pair of line side terminals for receiving electrical service, and connected with the remote disconnect switch, and an additional pair of terminals respectively connected with the pair of line terminals, and connected with the metrology, such that the metrology monitors electrical service at the line side terminals; and wherein the current acquisition circuitry and the voltage acquisition circuitry are configured for receiving multi-phase electrical service current and voltage signals, respectively.

12. Methodology as in claim 7, further comprising actuating the remote disconnect switch so as to electrically connect the meter line side relative to the meter load side, responsive to data indicating that a connect operation of the remote disconnect switch is to be conducted.

13. Methodology for an advanced metering system with added functionality based on improved connect/disconnect cycle life, comprising:

providing a plurality of end devices, at least some of which end devices comprise electricity meters, each of such electricity meters having a line side for receiving electrical service; a load side, downstream from the meter line side, for electrically connecting with an electrical load; a remote disconnect switch, upstream from the meter load side and downstream from the meter line side, for controllable actuation for electrically connecting and disconnecting the meter line side relative to the meter load side, so that electrical service when present at the meter line side is, respectively, electrically connected with, and disconnected from, an electrical load when present at the meter load side; and metrology, downstream from the meter line side and upstream from the meter load side, for monitoring the consumption or production of electricity vis-a-vis electrical service and electrical load associated with the meter;

providing a network including central collection functionality;

configuring the network for bi-directional communications between the central collection functionality and each of the plurality of end devices;

connecting electrical service to the meter line side of at least one of such electricity meters; and connecting an electrical load to the meter load side of such at least one electricity meter;

communicating data across the network to such at least one electricity meter regarding actuation of the remote disconnect switch, and regarding consumption of electrical service at such at least one electricity meter;

responsive to data indicating that a disconnect operation of the remote disconnect switch at such at least one electricity meter is to be conducted, effecting such disconnect operation once disconnect criteria are satisfied, including a disconnect command at said remote disconnect switch and data that load current as determined by the metrology has fallen below a load current threshold; and responsive to data indicating that a connect operation of the remote disconnect switch at such at least one electricity meter is to be conducted, effecting such connect operation;

whereby the disconnect/connect cycle life of the remote disconnect switch is relatively extended.

14. Methodology as in claim 13, wherein:

the disconnect criteria correspond to at least two configurable parameters relative to monitoring of the metrology, with one of such at least two configurable parameters comprising the maximum time that the disconnect operation of the remote disconnect switch will be delayed to wait for the load current as determined by the metrology to fall below the load current threshold before effecting disconnection of the meter load side.

15. Methodology as in claim 13, further comprising, in response to data indicating that an immediate disconnect operation of the remote disconnect switch is to be conducted, ignoring the disconnect criteria and immediately effecting such disconnect operation.

16. Methodology as in claim 13, further comprising:
providing the metrology with current acquisition circuitry for receiving electrical service current signals, and voltage acquisition circuitry for receiving electrical service voltage signals; and
providing the bi-directional communications so as to include at least one bi-directional communications module configured to effect bi-directional communications between the meter and other networked devices using an open standard meter communication protocol, with the at least one communications module including one of an additional circuit board dedicated to WAN connectivity and one or more of GPRS, Ethernet, and RF LAN communications modules.

17. Methodology as in claim 16, wherein:
the current acquisition circuitry and the voltage acquisition circuitry are configured for receiving multi-phase electrical service current and voltage signals, respectively;
the meter further includes a pair of line side terminals for receiving electrical service, and connected with the remote disconnect switch, and an additional pair of terminals respectively connected with the pair of line terminals, and connected with the metrology, such that the metrology monitors electrical service at the line side terminals; and
wherein the current acquisition circuitry and the voltage acquisition circuitry are configured for receiving multi-phase electrical service current and voltage signals, respectively.

18. Methodology as in claim 13, wherein said methodology further comprises:
configuring selected of the plurality of end devices to relay bi-directional communications between the central collection functionality and others of the plurality of end devices; and
wherein establishing a network further includes:
providing at least one cell relay; and
configuring the network such that bi-directional communication between the central collection functionality and selected of the plurality of end devices passes through the at least one cell relay;
whereby bi-directional communication between the central collection functionality and selected of the plurality of end devices is conducted by way of the cell relay while bi-directional communication between the central collection functionality and others of the plurality of end devices is conducted directly; and wherein configuring the network for bi-directional communications includes using an open standard meter communication protocol.

19. An advanced metering system with added remote disconnect switch cycle life based on meter disconnect features, comprising:
a plurality of end devices, at least some of which end devices comprise electricity meters, each of such electricity meters having a line side for receiving electrical service;
a load side, downstream from the meter line side, for electrically connecting with an electrical load;
a remote disconnect switch, upstream from the meter load side and downstream from the meter line side, for controllably actuating for electrically connecting and disconnecting the meter line side relative to the meter load side, so that electrical service when present at the meter line side is, respectively, electrically connected with, and disconnected from, an electrical load when present at the meter load side; and
metrology devices, downstream from the meter line side and upstream from the meter load side, for monitoring the consumption or production of electricity vis-à-vis electrical service and electrical load associated with the meter; and
a network including central collection functionality, and configured for bi-directional communications between the central collection functionality and each of said plurality of end devices, such that data may be communicated across said network regarding actuation of the remote disconnect switch of an electricity meter and consumption of electricity at the meter load side thereof, with such remote disconnect switch responsive to data indicating that a disconnect operation of the remote disconnect switch is to be conducted, for effecting such disconnect operation once disconnect criteria are satisfied, including a disconnect command at said remote disconnect switch and data that load current as determined by said metrology has fallen below a load current threshold, whereby the disconnect/connect cycle life of the remote disconnect switch is relatively extended.

20. An advanced metering system as in claim 19, wherein:
the disconnect criteria correspond to at least two configurable parameters relative to monitoring of the metrology, with one of such at least two configurable parameters comprising the maximum time that the disconnect operation of the remote disconnect switch will be delayed to wait for the load current as determined by the metrology to fall below the load current threshold before effecting disconnection of the meter load side;
if commanded for immediate disconnect, said remote disconnect switch immediately disconnects the meter load side with a disconnect operation of the remote disconnect switch regardless of the value of any disconnect criteria.

21. An advanced metering system as in claim 19, wherein:
selected of said plurality of end devices are configured to relay bi-directional communications between the central collection functionality and others of said plurality of end devices;
said network further includes at least one cell relay, with said bi-directional communication between the central collection functionality and selected of said plurality of end devices passing through the at least one cell relay, whereby bi-directional communication between the central collection functionality and selected of said plurality of end devices is conducted by way of the cell relay while bi-directional communication between the central collection functionality and others of the plurality of end devices is conducted directly;
said network is configured for bi-directional communications includes using an open standard meter communication protocol;
the metrology of each electricity meter includes current acquisition circuitry for receiving electrical service current signals, and voltage acquisition circuitry for receiving electrical service voltage signals, with such current acquisition circuitry and voltage acquisition circuitry configured for receiving multi-phase electrical service current and voltage signals, respectively; and each electricity meter includes at least one communications module configured to effect bi-directional communications between the meter and other networked devices using an open standard meter communication protocol, with such at least one communications module including an additional circuit board dedicated to WAN connectivity, or one or more of GPRS, Ethernet, and RF LAN communications modules.

* * * * *